July 23, 1957　　　J. H. COOPER　　　2,800,568
METHOD AND APPARATUS FOR NARROW LAP OR SEMI-MASH SEAM WELDING
Filed Sept. 28, 1955　　　　　　　　　　5 Sheets-Sheet 1
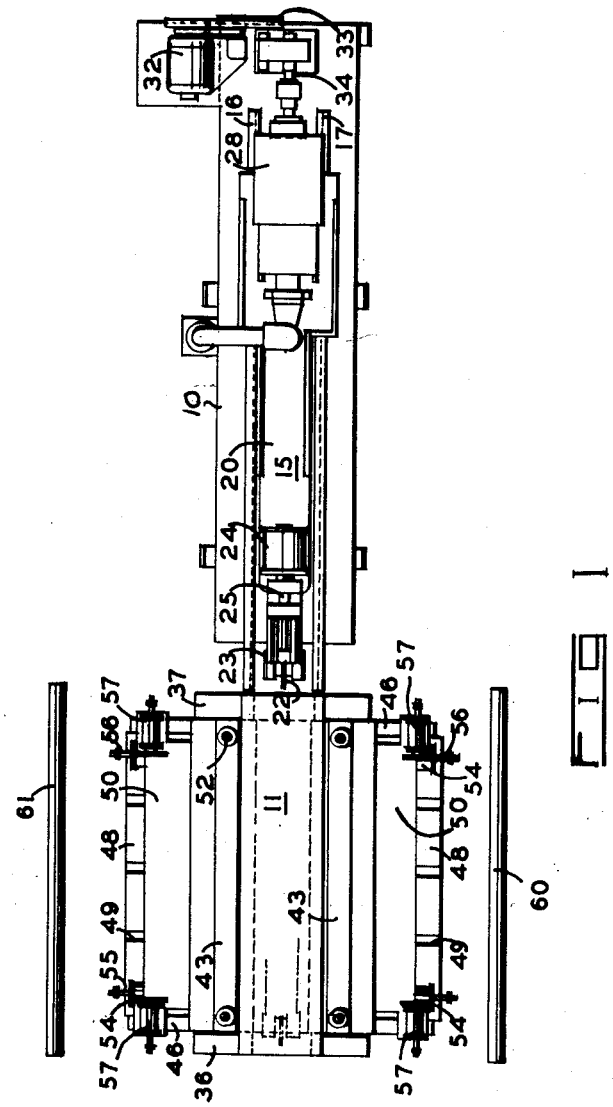
INVENTOR
JOSEPH H. COOPER
BY *Francis J. Klempay*
ATTORNEY

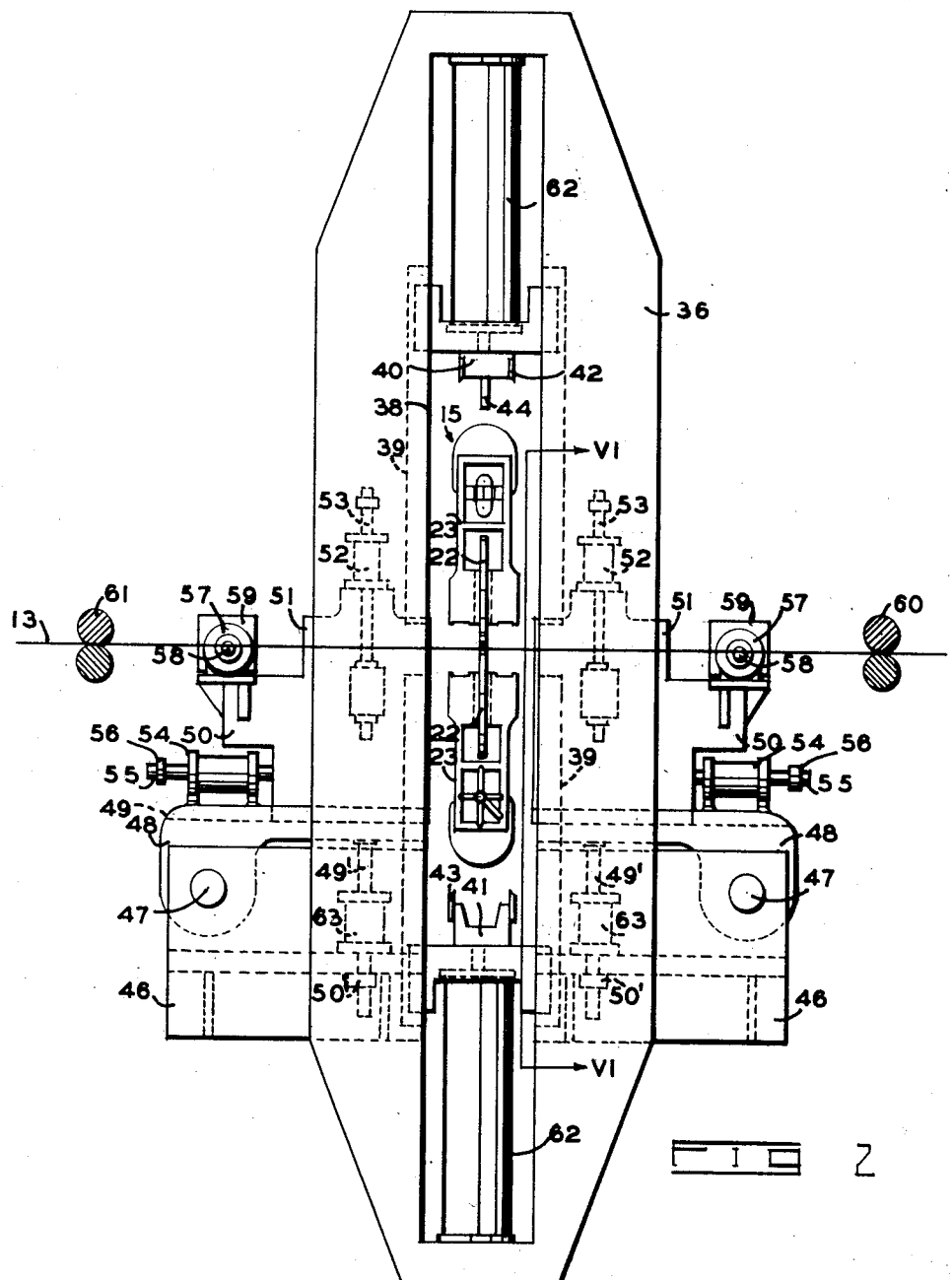

July 23, 1957   J. H. COOPER   2,800,568
METHOD AND APPARATUS FOR NARROW LAP OR SEMI-MASH SEAM WELDING
Filed Sept. 28, 1955   5 Sheets-Sheet 3
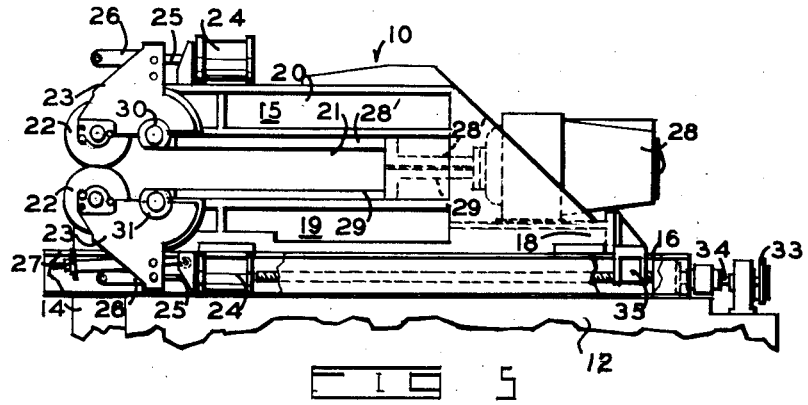
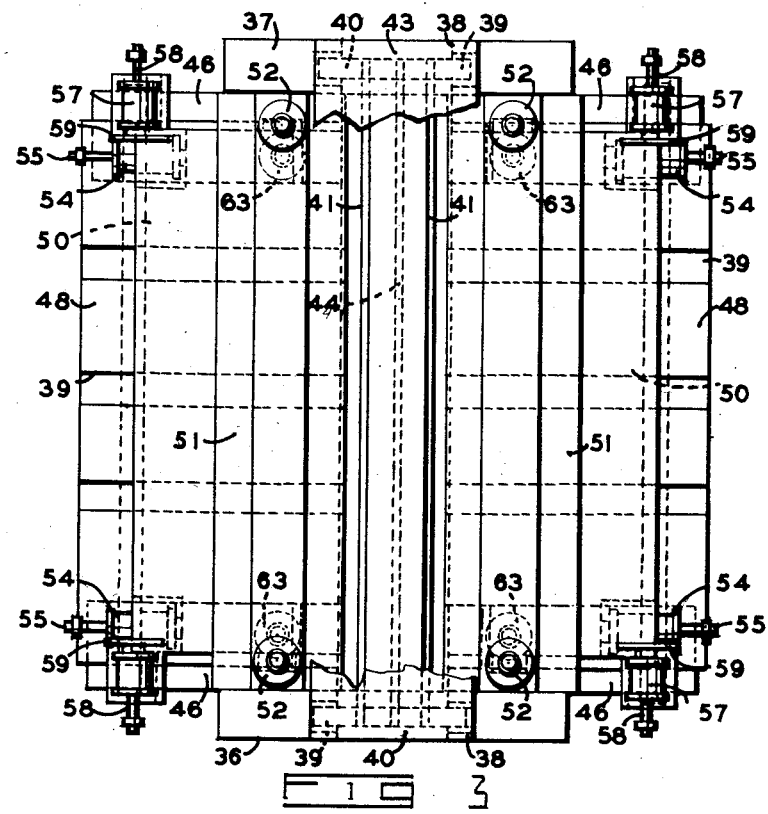
INVENTOR
JOSEPH H. COOPER

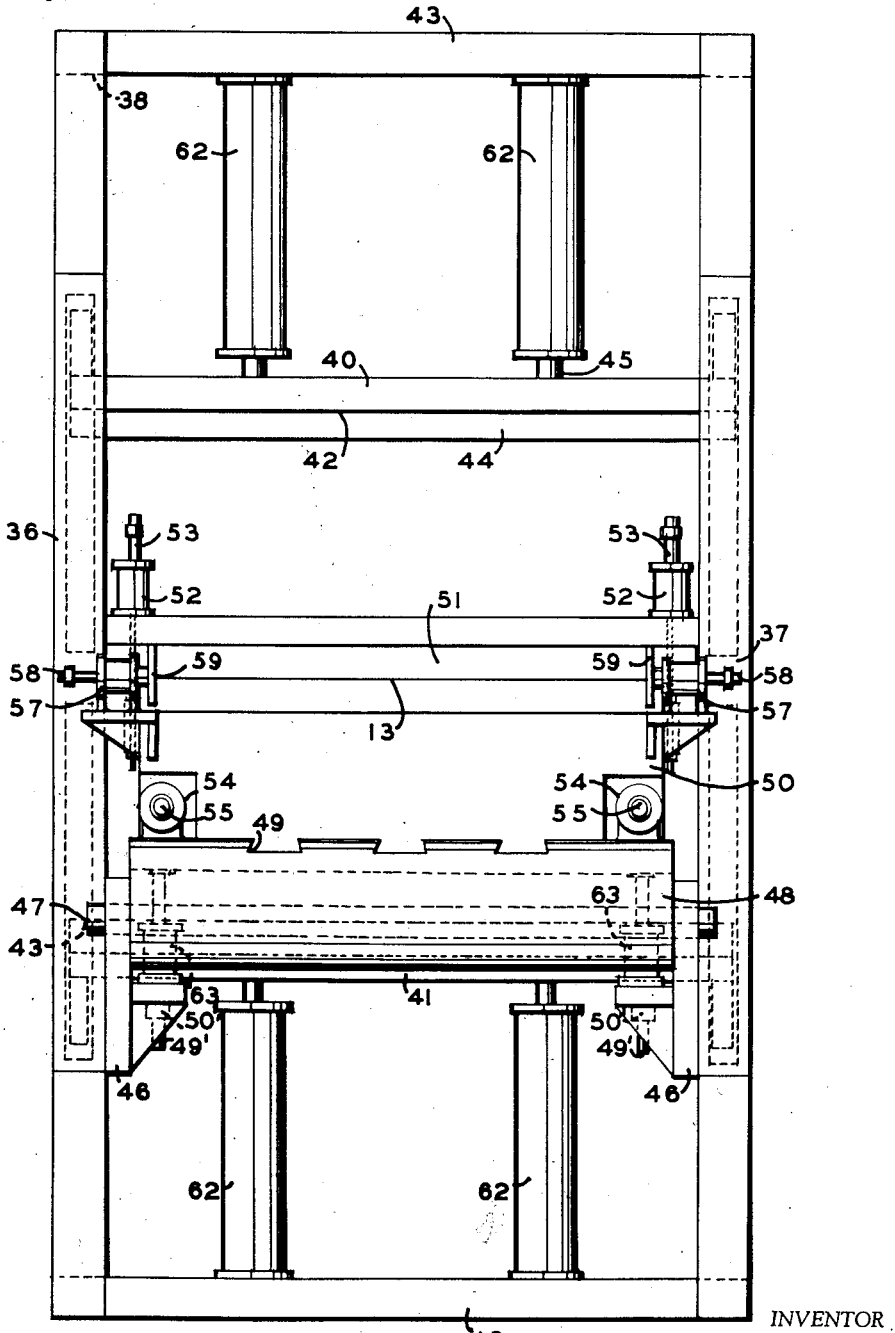

July 23, 1957 J. H. COOPER 2,800,568
METHOD AND APPARATUS FOR NARROW LAP OR SEMI-MASH SEAM WELDING
Filed Sept. 28, 1955 5 Sheets-Sheet 5

INVENTOR
JOSEPH H. COOPER
BY Francis J. Klempay
ATTORNEY

United States Patent Office 2,800,568
Patented July 23, 1957

2,800,568

METHOD AND APPARATUS FOR NARROW LAP OR SEMI-MASH SEAM WELDING

Joseph H. Cooper, Warren, Ohio, assignor to The Taylor-Winfield Corporation, Warren, Ohio, a corporation of Ohio Application September 28, 1955, Serial No. 537,222

20 Claims. (Cl. 219—82)

The present invention relates in general to the art of electric resistance welding, and more particularly to the joining of metal strips and sheets in an end-to-end relation by electric resistance welding methods.

It has heretofore been proposed to employ a so-called narrow lap or semi-mash welder device in which the successive ends of coils or sheets are overlapped a very slight distance and during the heating and fusing are partly deformed and flattened by the passage of welding electrodes across the overlap under relatively high pressure. The resultant weld may be of smaller thickness than the aggregate thickness of the two unwelded strips.

In the operation of a narrow lap welder it is desirable to have a narrow lap, usually not over ¼ of an inch in most cases depending upon the composition and thickness of the material to be worked, that can be accurately and precisely controlled, because a narrow lap results in a uniform weld and greater mashing down of the joined strips or sheets. It should be readily understood that the thickness of the strips and the area of their overlap will dictate the force needed to mash the strips and also the electric potential needed. Thus, the narrower the lap the less mechanical force and electrical energy that is required.

Because the control of the overlap is very critical it is an important object of the invention to provide apparatus that properly aligns, clamps and controls the overlap of strips or sheet ends. This apparatus is especially adapted to handle strip and sheets of very great width that are especially difficult to prepare for welding.

Yet another specific object of this invention is to provide new and novel means for raising one or both of the sheets above the level of strip travel and then accurately move the strips into an overlapping relation.

More particularly the invention teaches the use of clamps movable to forcibly engage and hold the strips in clamped relation during proper positioning, shearing, and movement to form the overlap of a predetermined distance. It is apparent that since the amount of overlap is small the ends of coils and sheets must be rigidly and securely clamped during all steps of the welding operation. To accomplish this end, clamping members are provided that serve to hold the strips and are movable independently of the pivot members for raising either one or both of the pivotal members for overlapping the strips or sheets.

Another specific feature of the invention resides in the incorporation of movable shear members and a gauging bar that are operative to gauge and shear the strips and sheets to be joined while they are rigidly held by the clamping members. This is very desirable since if the ends of the strips were sheared on a machine separated from the line of welding traverse, the strips would not be clamped during the entire operation. On the other hand, when the strips are clamped at all times during shearing and positioning, it is insured that the overlap will always be of uniform distance along the width of the strip. This results in a uniform weld across the width of the workpieces.

Yet another object of the invention is the provision of narrow lap or semi-mash welding apparatus having the above-stated characteristics which is more compact and generally of a more simplified nature than apparatus heretofore proposed for the same general purpose.

The above and other objects and advantages of the invention will become apparent upon consideration of the full detailed specification and accompanying drawing wherein is found an illustrated embodiment of my invention.

In the drawing:

Figure 1 is a top plan elevation of a semi-mash welder constructed in accordance with the teachings of my invention;

Figure 2 is an end elevation of the improved aligning, shearing, and overlapping apparatus of my invention;

Figure 3 is a partial top plan view of the apparatus depicted in Figure 2;

Figure 4 is a side elevation of the embodiment as shown in either Figure 2 or Figure 3;

Figure 5 is a side elevation of the retracted welder electrodes and certain other equipment appurtenant thereto.

Figure 6:
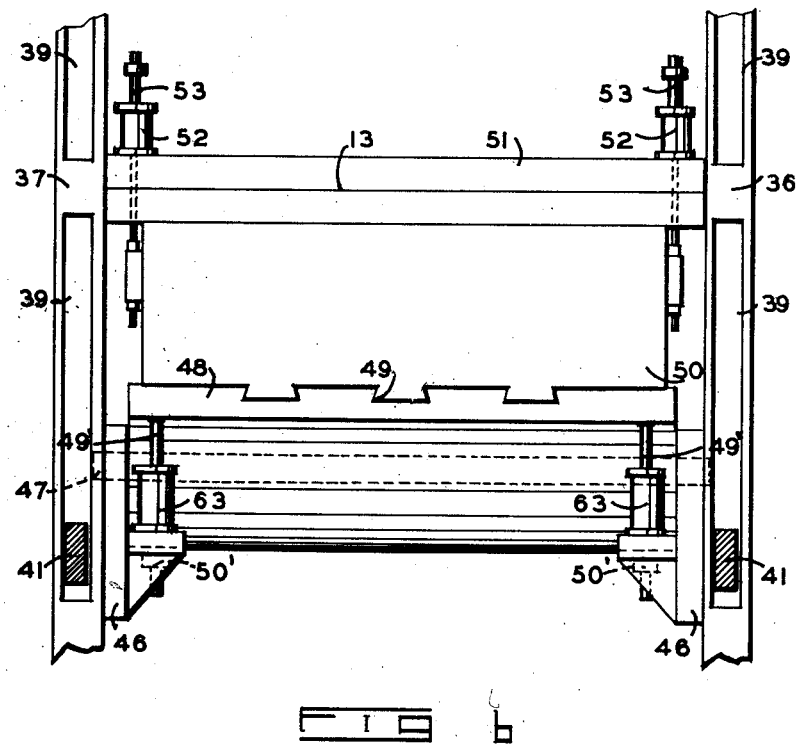
Figure 6 is a view taken along the section lines VI—VI of Figure 2.

Referring now to the drawing, and initially to Figure 1 thereof, the numeral 10 designates in general a welding machine and 11 indicates apparatus and equipment for accurately positioning, shearing, and overlapping the strips to be welded. The component pieces of equipment will be discussed in further detail in the following description.

As shown in Figures 1 and 5, a base or foundation structure 12 is mounted on the plant floor, not shown, below and in aligned relation to a strip pass line 13. At one end of the base 12 is positioned apparatus 11 to accurately position, shear and overlap the strips to be worked. These machines are mounted in embracing relation to the pass line 13 so that the strip material is caused to pass therethrough during its travel.

Intermediate the ends of the base 12 is a large upwardly opening recess 14 which is adapted to movably receive a generally transversely disposed and transversely movable welder assembly 15. The base 12 is provided with transversely disposed and longitudinally supported parallel tracks 16 and 17 which extend a substantial distance outwardly on the base 12 proper, and which serve to support the welding assembly 15 in various positions over a traverse of substantial length to allow movement of various parts of the positioning assemblies 11 as indicated in Figure 1, for example.

The welder assembly 15 comprises a base portion 18 which supports at its forward end the lower disposed horizontally extending electrode mounting arm 19. Secured in rigid relation to the lower arm 19 is an upper arm 20 which is disposed in a generally parallel relation to the lower arm 19, being spaced above the latter, thereby defining a horizontal forwardly opening recess 21.

At the forward extremity of each of the electrode mounting arms 19 and 20 is mounted an electrode assembly comprising an electrode wheel 22 and a journal bracket 23 therewith which is pivotally secured by bearing members 30 and 31 to its respective mounting arm 19 or 20. On each of the electrode arms 19 and 20 there is mounted an electrode actuating cylinder 24 and the piston rod 25 which extends through the journal bracket 23 by way of a connecting link 26. The links 26 form an interconnection between the linearly movable piston rods 25 and the accurately movable journal brackets 23 so that when either or both of the cylinders 24 are actuated, the electrode wheels 22 are caused to move toward or away from the strip pass line. As will be observed, the lower electrode wheel assembly is provided with adjustable movement limiting means 27 to adjustably restrict the movement of the lower electrode assembly.

Mounted on the outer end portion of the mounting arm 18 of the welder assembly is the heavy duty electrical transformer 28. The secondary terminals of the transformer face forwardly and are connected with the heavy current conductors 28' and 29. These conductors extend along the inward edge of the electrode mounting arms 19 and 20 and are connected to the conducting bearing members 30 and 31. The current conducting members are insulated from the electrode arm as well as from each other as is readily understood. In this manner the flow of current is limited to the conductors 28' and 29, the conducting bearings 30 and 31, journal brackets 23, and the electrode wheels 22.

In the performance of a welding operation, the opposite ends of successive coils are squared and positioned in slightly overlapping relation along the plane defined by the welding electrodes 22. The cylinders 24 are then actuated in an extending direction forcing the electrode wheels 22 toward each other. With pressure thus applied the welder assembly is moved transversely with respect to the base 12 so that the electrode wheels are caused to traverse the overlapped workpieces. Welding current is supplied to the electrodes during the traverse so that the overlapped strips are heated and fused together to form the weld. The pressure exerted by the actuators 24 through the electrode wheels 22 tends to flatten the overlapped strip so that it is of substantially less thickness than the aggregate thickness of the two unwelded pieces.

To draw the welder assembly through the traverse there is provided a drive motor 32 which operates through a clutch or transmission mechanism 33 to drive an elongated threaded shaft 34 which is in driving engagement with the welder assembly 15 by cooperation with the threaded bearing 35.

As indicated in the discussion above, the strips to be joined are already in overlapped relation when the welder makes its traverse across the seam. To accurately and precisely control and expedite the preparation of the strips before the welder is energized, I provide apparatus generally designated by the numeral 11. This apparatus consists of large rectangular side housing members 36 and 37 which are positioned on each side and symmetrically about the path of strip travel 13. The side housings 36 and 37 each contain a large aperture 38 therein extending in the vertical direction. Slidably carried in the housings 36 and 37 by the recesses 39 are the upper and lower carriage members 40 and 41 adapted for movement toward and away from each other. The lower carriage 41 is positioned below the path of the strip travel 13 while the upper carriage 40 is supported directly above the strip path and in spaced relation to the lower carriage.

Rigidly secured to the carriages 40 and 41 and extending therefrom are cooperating shear blades 42 and 43 which extend across the path of travel of the strip. Also rigidly secured to the upper carriage and extending across the path of travel is a gauge bar 44 that hangs below the upper shears 42 as shown in Figure 2. Mounted on the plates 43 that join the side housing are large hydraulic actuators 62 having piston rods 45 connected to the carriages 40 and 41 in order that when the cylinders are actuated the carriages, including the shears and gauge bar associated therewith, are moved toward or away from the path of strip travel.

Spaced inwardly of the side housings 36 and 37 and below the path of the strip travel 13 are supporting members 46 which hold a pivot rod 47 in a corner thereof that extends across the path of strip travel and is spaced below said path. Pivotally supported by the pivot rod 47 is a pivot member 48 which is pivoted by the actuation of the cylinders 63 through the piston rods 49'. The piston rod 49' is provided with an adjustment nut 50' to accurately limit the distance of upward pivot of the member 48. When the cylinders 63 are not energized, the pivotal member may rest on the supporting members 46.

Slidably mounted on the pivotal member 48 by means of the spaced dove-tail ways 49 which extend in the direction of strip travel is a lower clamping block 50. An upper clamping block 51 is positioned above the lower clamping block 50 and the path of strip travel. These blocks are operative to firmly grip and hold the strip ends upon actuation of the cylinders 52 which are rigidly fastened to the upper clamp member 51 and have piston rods 53 securely fastened to the lower clamp member 50. By energizing the cylinders 52 the upper clamp 51 is caused to move into clamping relation with the lower clamp member.

Sitting on the pivotal members 48 are a plurality of actuating cylinders 54 having piston rods 55 that abut and are fastened to the lower clamp blocks 50 and upon actuation of the cylinders 54, the clamp members 50 and 51 are forced to move toward or away from the line that the welder assembly 10 traverses. The piston rods 55 protrude through the cylinders 54 and are threaded on the rear end to receive adjustable limiting nuts 56 which serve to control the forward movement of the clamps.

In order to properly position the strip, I have provided side guide members consisting of actuating cylinders 57 disposed transversely to the path of strip travel and spaced outwardly therefrom, piston members 58, and resilient plates 59 attached to the last mentioned piston members which are operative cooperatively to align successive trailing and leading ends of strip or coils to be joined.

In the illustrated embodiment of the invention reversing power driven pinch rolls 60 and 61 are provided on either side of the apparatus 11 to move the strip in preparation for a welding operation. It should be understood that the rolls are shown in schematic relation only and other equipment, not shown, is essential to their proper functioning.

In the preferred method of operation the welder is retracted and the lower shear blades 43 are positioned below the line of strip travel while the gauge bar 44 and the upper shear blades 42 are raised above the line of travel in order that the strip is not obstructed. The pivotal members 48 are pivoted to the down position so they are resting on the supporting frames 46 and the welder strip clamps 50 and 51 are open to provide freedom of movement for the strips. The side guides 59 are also in retracted position at the start of the joining operation.

With the apparatus thus prepared the tail end of a strip to be joined is allowed to pass under the gauge bar and shears by means of the pinch roll 60 and is then stopped. The upper carriage 40 is then lowered by the actuation of the cylinders above the pass line of the strip into gauging position (i. e. the gauge bar obstructs the line of travel). At the same time the lower shear blades are moved to a position just below the line of strip travel 13. The tail end of the strip or coil to be worked is then moved against the gauge bar 44 by reversing the pinch rolls 60 and the side guide mechanisms consisting of cylinders 57, piston rods 58, and resilient plates 59 are actuated to move this strip length into proper transverse alignment. When this is completed, the welder clamp pieces 50 and 51 are drawn toward the line of strip travel by actuating the cylinders 52 to firmly clamp and hold the strip against any undesirable movement. The upper carriage 40 is then forced down causing the upper shears 42 to trim or shear the tail end of the strip.

When the trailing end of the coil has been sheared the carriage 40 is slightly retracted, the arrangement being that the upper shears 42 are withdrawn and the gauge bar 44 is returned to gauging position. With the tail end of one coil properly aligned, sheared and clamped, the leading end of another coil is moved by the pinch rolls 61 into gauging position against the gauge bar 44. It should then be apparent that the same sequence of operations is performed on the leading end of the coil that has already been completed on the trailing end and equivalent apparatus is provided to accomplish these operations. The side guides are actuated to properly align the strip, the welding clamps are closed to firmly and tightly restrain the workpiece, and the upper shears are moved to shear and trim the leading edge of the strip. With this done the upper and lower carriages 40 and 41 are moved to the completely retracted position as shown in Figure 2 of the drawing.

It should be understood that in some applications it may be desirable to align, gauge, and clamp both the leading and trailing ends so that they may be sheared simultaneously instead of alternately as discussed above. In this method of operation the sequence of operations is the same although they are performed simultaneously on both the leading and trailing ends of the strip.

The firmly clamped strips are now ready to be overlapped and welded. To lap the strips one of the pivot members 48 is raised by the cylinders 63 through the piston rods 49' to a plane above that of the other strip. It is noted that pivotal members are provided to raise either or both the trailing and leading ends of the respective pieces of strip to be joined. In the contemplated use only one of the strips will be raised but it is possible to raise both and this may be desirable in some installations, the only restriction being that one end of the strip is above or below the plane of the other to permit moving the strip ends into an overlapping relation without interference.

In moving the strips to an overlapping position, the clamps are tightly closed, restricting any undesired movement of the strip. This is especially important since the overlap in mash-welding is very small and any adverse movement of the strip would result in an improper seam. To accomplish this desirable feature the clamps are slidably mounted on the pivotal members 48 by means of the dove-tailed ways 49 extending in the direction of strip travel. The actuators 54 are attached to the pivotal members 48 and communicate through the piston rods 55 which act to move the clamps holding the strip toward the line traversed by the welding machine to form an overlap. Since the amount of overlap is an important factor in obtaining favorable results, I have provided that the piston rods 55 protrude through the rear end of the cylinders 54 and are threaded to receive an adjustable nut that may be infinitely adjusted to limit the extent of forward movement of the strips and the clamps. It should be understood that both of the clamps comprised of blocks 50 and 51 are adapted to be moved together and in a cooperating manner to form the desired overlap.

With the strip properly positioned and overlapped, the welder assembly 10 is energized to move in a transverse direction across the overlap thus completing the weld. The cylinders 25 are actuated closing the electrode wheels 22 on the strip, welding current is applied to said electrodes and the welder assembly is moved to traverse the overlap. The pressure exerted by the cylinder 24 through the electrode wheels should be sufficient to mash the overlapping portion of the strip to a thickness much less than that of the two overlapped strips.

When the overlap has been traversed the welding current and the pressure on the electrodes are relieved and the electrodes are withdrawn from the workpieces. The welder assembly is retracted to the initial position as shown in Figure 1. The clamps are then released, thus freeing the strip, and pivoted downwardly, and the welded strip is free to move through the assembly by means of the pinch rolls for further processing.

It should thus be apparent that I have accomplished the objects initially set forth by providing improved apparatus for electric resistance welders of the type particularly known as semi-mash or narrow-lap seam welders. This type of welder has many advantages over other welding apparatus for joining the ends of coils or sheets to form a continuous strip of metal for further processing.

Since in the narrow-lap or semi-mash weld process the positioning of the strips and their overlapping is the most critical detail due to the very thin overlap, I have provided improved positioning apparatus where the strips are firmly and rigidly clamped to prevent any objectionable movement of the strips during the positioning operation. This is carried out by novel clamps that are movable in the plane of strip travel toward and away from the line the welder traverses.

To insure proper overlapping, one strip must be raised slightly above the other, and this is accomplished by means of pivot members that carry the welder clamps. Attention is also directed to the overall arrangement of the apparatus including the shears and gauge bar for trimming and squaring the strip ends. The resulting apparatus is much more efficient than has been heretofore known in the art and is of such construction that manufacture and assembly is easily and expediently completed.

In carrying out semi-mash welding as a step in a continuous process line, speed is of the utmost importance, and I have provided a sequence of operations that may be carried out and completed with a minimum of time thus requiring much less slack and expensive equipment to handle it. It should also be apparent that the machine is not dependent on one direction of travel but may in fact be used to join strip traveling in either direction due to its symmetrical construction about the line of overlap.

For those desiring further information on the general type of apparatus employed reference should be had to my co-pending patent application, Serial No. 528,202, filed August 15, 1955, and assigned to the assignee of the present invention.

It should be understood, however, that the specific embodiment herein described is intended to be illustrative only and many changes may be made therein without departing from the clear teachings of the invention. Reference should therefore be made to the following appended claims in determining the full scope of the invention.

I claim:

1. In a welder of the type wherein adjacent ends of strip sections to be welded are positioned in slightly overlapping relation and are traversed by opposed welding electrodes, the combination of a pair of side housings spaced on opposite sides at a greater distance than the width of strips to be joined, upper and lower carriage members slidably received in said housing above and below the path of strip travel, cooperating shear members attached to said carriage members, a gauge bar attached to one of said carriage members and extending beyond the shear member attached thereto, said shear members and gauge bar extending transversely across the path of strip travel, actuator means for moving said carriage members toward and away from each other into gauging and shearing positions in a vertical direction, clamping means including clamping members adapted to extend transversely across the path of strip travel, actuating means to move said clamping members into clamping relation, a pivotal member disposed below and having its axis of pivotal support extending transversely with respect to the pass line of the strip, power means for pivoting said pivotal member about said axis, said clamping means being mounted on said pivotal member by slides extending in the direction of strip travel, separate power means attached to said pivotal member and having driving connection with said clamping means whereby said clamping means may be moved generally horizontally independently of said pivotal member when said pivotal member is in a raised position to cause an overlap of the strip sections clamped by said clamping means, and means to accurately limit the movement of said clamping means.

2. The method of preparing sections of metal strips for welding by opposed welding electrodes to form a continuous metal strip wherein the welded seam is of less thickness than the aggregate thickness of the strip sections to be joined said steps comprising: moving the trailing edge of a first strip section to one side of said welding electrodes, gauging said trailing edge of said first strip section, moving a leading edge of a second strip section to the opposite side of the welding electrodes, gauging said leading end of said second strip section, firmly clamping said strip sections on opposite sides of said welding electrodes closely adjacent said ends of said strip sections and said welding electrodes, shearing the ends of said strip sections while still clamped adjacent said welding electrodes, elevating the end of one of said strip sections above the horizontal plane defined by the end of said other strip section while both of said strip sections are still clamped, moving at least one of said strip sections while still clamped and in offset relation with respect to each other to form an overlap, traversing said overlap with said welding electrodes, and freeing the welded strip sections for further movement.

3. The method of preparing sections of metal strips for welding by opposed welding electrodes to form a continuous metal strip the steps comprising: moving the trailing edge of a first strip section to one side of said welding electrodes, moving the leading edge of a second strip section to said opposite side of the welding electrodes, firmly clamping said strip sections on opposite sides of said welding electrodes closely adjacent thereto and closely adjacent the ends of said strip sections, shearing said ends of said strip sections while the same are still clamped, moving the end of one of said strip sections to vertical offset relation with respect to the horizontal plane defined by the end of the other strip section while both of said strip sections are still clamped, moving said strip sections while still clamped and in offset relation with repect to each other to form an overlap, traversing said overlap with said welding electrodes, and freeing the welded strip sections for further movement.

4. In a welder of the type wherein adjacent ends of strip sections to be welded are accurately positioned and are traversed by welding means; the combination of a housing having an opening therein for the reception of said welding means, gauging and shearing means adapted to be interposed in said opening in obstructing relation with the path of strip travel, strip clamping means on opposite sides of said opening, means to elevate said clamping means positioned on at least one side of said opening above said path of strip travel, and means to horizontally move said clamping means positioned on at least one side of said opening.

5. Apparatus according to claim 4 further characterized in that said means to elevate comprises pivotal means mounted on said housing below said path of strip travel, and said elevatable clamping means being mounted on said pivotal means.

6. Apparatus according the claim 5 further characterized in that said elevatable clamping means comprises a pair of vertically movable clamping members disposed above and below said line of strip travel, linkage means interconnecting said clamping members, and the one of said clamping members below said line of strip travel being mounted on said pivotal means.

7. Apparatus according to claim 5 further characterized in that said elevatable clamping means is slidably mounted on said pivotal member by a plurality of slides extending in the direction of said path of strip travel.

8. In a strip welding device the combination with transversely movable welding means of a housing having a transverse opening therein, upper and lower carriage members slidably received in said housing above and below the line of strip travel, shear means attached to each of said carriage members, gauge bar means mounted on one of said carriage members and extending beyond said shear means attached thereto, actuator means for moving said carriage members toward and away from said path of strip travel, clamping means positioned on opposite sides of said carriages, means to vertically move said clamping means positioned on at least one side of said carriages, and means to horizontally move said clamping means positioned on at least one side of said carriages.

9. Apparatus according to claim 8 further characterized in that each of said clamping means comprises clamping members positioned above and below said path of strip travel, and means for actuating said clamping members to clamping relation independently of said means to vertically move and said means to horizontally move.

10. Apparatus according to claim 8 further characterized in that said means to vertically move comprises pivotal members disposed on opposite sides of said carriage members and mounted on said housing, means for pivoting said last mentioned members, and said clamping means being mounted on said pivotal members.

11. Apparatus according to claim 10 further characterized in that said means to horizontally move comprises actuating means mounted on said pivotal members and having driving connection with said clamping means.

12. Apparatus according to claim 10 further characterized in that said clamping means are mounted on said pivotal members by slides extending in the direction of strip travel.

13. In a welder of the type wherein adjacent ends of strip sections to be welded are positioned and are traversed by welding means; the combination of a housing having an opening therein for the reception of said welding means, gauging and shearing means adapted to be interposed in said opening in obstructing relation with the path of strip travel, strip clamping means positioned on opposite sides of said welding means, means to vertically move said clamping means positioned on at least one side of said welding means, means to horizontally move said clamping means positioned on at least one side of said welding means, and means to adjustably limit the horizontal movement of said clamping means.

14. Apparatus according to claim 13 further characterized in that said means to vertically move further comprises vertically movable members mounted on said housing, said clamping means being mounted on said vertically movable members, and said means for horizontally moving comprising actuating means mounted on said vertically movable members and having driving connection with said clamping means.

15. In a welder wherein adjacent ends of strip sections to be welded are positioned and traversed by welding means the combination of a housing having an opening therein for the reception of said welding means, gauging means adapted to be interposed in said opening in obstructing relation with the path of strip travel, strip clamping means positioned on opposite sides of said welding means, means to vertically move said clamping means positioned on at least one side of said welding means, means to horizontally move said clamping means positioned on at least one side of said welding means, and means to adjustably limit the horizontal movement of said clamping means.

16. Apparatus according to claim 15 further characterized in that said means to vertically move comprises vertically movable members mounted on said housing, said clamping means being mounted on said vertically movable means, and said means for horizontally moving comprising actuating means mounted on said vertically movable members and having driving connection with said clamping means.

17. The method of preparing sections of metal strips for welding by traveling welding means to form a continuous metal strip the steps comprising: moving the trailing edge of a first strip section to one side of said welding means, gauging said trailing edge of said first strip section, moving a leading edge of a second strip section to the opposite side of said welding means, gauging said leading end of said second strip section, firmly clamping said strip sections on opposite sides of said welding means closely adjacent said ends of said strip sections and said welding means, shearing the ends of said strip sections while still clamped adjacent said welding means, moving the end of one of said strip sections to vertical offset relation with respect to the horizontal plane defined by the end of the other strip section while both of the strip sections are still clamped, moving said strip sections while still clamped and in offset relation with respect to each other to form an overlap, traversing said overlap with said welding means, and freeing said strip sections for further movement.

18. In strip welding apparatus of the type having means to clamp strip sections, the improvement comprising a pair of clamping members disposed above and below the path of strip travel, linkage means interconnecting said clamping members, the one of said clamping members below said path of strip travel being mounted on a pivotal member, means to pivot said last mentioned member, and means to horizontally move said clamping members, said means to horizontally move comprising actuating means mounted on said pivotal member and having driving connection with said clamping members.

19. In strip welding apparatus of the type having means to clamp and position strip sections, the improvement comprising a pair of clamping members disposed above and below the path of strip travel, linkage means interconnecting said clamping members, one of said clamping members being mounted on a pivotal member, means to pivot said last mentioned member, means to horizontally move said clamping members independently of the position of said pivotal member, and means to adjustably limit the horizontal movement of said clamping means.

20. Apparatus according to claim 19 further characterized in that said one of said clamping members is mounted on said pivotal member by slides extending in the direction of strip travel.

References Cited in the file of this patent

UNITED STATES PATENTS

| | | |
|---|---|---|
| 2,362,388 | MacChesney et al. | Nov. 7, 1944 |
| 2,369,830 | Johnson et al. | Feb. 20, 1945 |
| 2,412,648 | Rendel | Dec. 17, 1946 |
| 2,663,784 | Iversen | Dec. 22, 1953 |